US008517711B2

(12) United States Patent
Winzinger

(10) Patent No.: US 8,517,711 B2
(45) Date of Patent: Aug. 27, 2013

(54) APPARATUS FOR MOULDING PLASTIC PREFORMS WITH SYNCHRONOUS HEATING AND STRETCHING

(75) Inventor: Frank Winzinger, Regensburg (DE)

(73) Assignee: KRONES AG (DE)

( * ) Notice: Subject to any disclaimer, the term of this patent is extended or adjusted under 35 U.S.C. 154(b) by 177 days.

(21) Appl. No.: 12/847,176

(22) Filed: Jul. 30, 2010

(65) Prior Publication Data

US 2011/0024953 A1 Feb. 3, 2011

(30) Foreign Application Priority Data

Jul. 31, 2009 (DE) ......................... 10 2009 035 868

(51) Int. Cl.
*B29C 49/12* (2006.01)
*B29C 49/68* (2006.01)

(52) U.S. Cl.
USPC ......................... 425/174.4; 425/526; 425/529

(58) Field of Classification Search
USPC .............. 425/174.4, 526, 529; 264/454, 458, 264/521, 532, 535
See application file for complete search history.

(56) References Cited

U.S. PATENT DOCUMENTS 4,128,383 A * 12/1978 Bond et al. .................... 425/529
4,315,725 A * 2/1982 Yoshino ..................... 425/174.4
4,657,502 A 4/1987 Rydmann ..................... 425/526
4,836,971 A 6/1989 Denis et al. .................. 264/521
5,281,387 A * 1/1994 Collette et al. ................ 264/521
5,611,987 A * 3/1997 Kato et al. .................... 264/458
5,641,451 A * 6/1997 Orimoto et al. ............... 264/521
5,829,614 A 11/1998 Collette et al. ................ 215/375
6,106,762 A * 8/2000 Agur et al. .................... 264/512
6,620,352 B1 * 9/2003 Davis et al. .................. 264/40.4
7,354,538 B2 * 4/2008 Semersky et al. ............ 264/40.1
2005/0046085 A1 3/2005 Voth et al. ..................... 264/346
2010/0052224 A1 * 3/2010 Humele et al. ................ 264/489

FOREIGN PATENT DOCUMENTS

| | | |
|---|---|---|
| CN | 1089226 | 7/1994 |
| DE | 1 816 489 | 8/1970 |
| DE | 3314106 | 10/1984 |
| DE | 693 13 862 | 1/1998 |
| DE | 102006015475 | 10/2006 |
| DE | 10 2007 022 386 | 11/2007 |
| EP | 0237459 | 9/1987 |
| JP | 59215831 A * | 12/1984 |
| JP | 4119819 | 4/1992 |
| JP | 2006103260 | 4/2006 |
| WO | 03022551 | 3/2003 |

OTHER PUBLICATIONS

German Search Report dated Aug. 4, 2011, 10 2009 035 868.4, (8 pgs).
European Search Report (w/English translation of relevant portions) issued for corresponding application No. 10 171 231.3, dated Nov. 8, 2012 (8 pgs).
Chinese Office Action issued in corresponding application No. 2010102487682, dated Oct. 24, 2012 (10 pgs).

* cited by examiner

*Primary Examiner* — Robert B Davis
(74) *Attorney, Agent, or Firm* — Hayes Soloway P.C.

(57) ABSTRACT

An apparatus for molding plastic containers, including a transport device which transports the plastic preforms, including a heating device for heating areas of the plastic preforms and including a stretching device mechanically acting upon the plastic preforms, which stretching device stretches the plastic preforms along the longitudinal direction (L) thereof. The heating device and the stretching device are arranged in such a way that the plastic preforms may be heated before and after the stretching of the plastic preforms.

21 Claims, 8 Drawing Sheets

APPARATUS FOR MOULDING PLASTIC PREFORMS WITH SYNCHRONOUS HEATING AND STRETCHING

BACKGROUND OF THE INVENTION

The present invention relates to an apparatus for moulding plastic containers. Apparatus of this kind have been known from the prior art for a long time. Thus, it is known to heat plastic preforms initially in heating sections and subsequently to expand them into their final bottle form using apparatus such as blow moulding machines. In such blow moulding machines, so-called stretching rods are usually also used, which stretch the containers during the expansion operation in their longitudinal direction.

From DE 33 141 06 A1, a method and an apparatus for producing hollow bodies from hot-forming plastics are known. This expansion process is carried out in two steps, wherein initially a tooling-free blowing up of the preform under application of heat is carried out and subsequently, in a main blowing process which is carried out in a further stage, the final form of the container is created. This method, which was disclosed in the above-mentioned patent application from the early 80s, has by now become obsolete in as far as usually the entire moulding process is carried out in one step, i.e. both a pre-blowing step and the actual main blowing step are carried out within the same moulding process.

In particular, meanwhile even complex bottle shapes may be achieved using this method, whilst according to DE 33 141 06 A1 the primary object was to produce containers in a complex shape from plastic preforms.

From WO 03/022551 A1, an apparatus and a method for controlling the temperature of preforms are known. Here, a temperature control unit to be introduced into the interior of the preforms is provided.

EP 0237459 B1 describes a method and an apparatus for producing containers. Here, the moulding of the plastic preform is carried out in several steps. More specifically, upon heating of the plastic preform, an intermediate container is initially formed and subsequently this intermediate container is heated and then moulded into its final shape.

More recently, however, attention has been shifted to an increasing degree on saving costs during the manufacture of such plastic containers. In particular, methods are being sought that allow the amount of materials used to be reduced. During the manufacture of these plastic containers, the plastic preforms already have their final screw thread and only the base body of the preform is stretched. For this reason it is necessary to make absolutely sure that the area of the thread is not damaged during the moulding process, otherwise it will later be impossible to attach the thread screw caps properly. With this approach, however, it is sometimes inevitable that an unstretched or comparatively thick wall area remains immediately below the so-called support ring of the container. However, this area involves an increased use of material.

SUMMARY OF THE INVENTION

The present invention is therefore based on the object of providing an apparatus and a method which allow a more cost-effective production of plastic containers to be achieved. In particular, the use of materials is supposed to be reduced during the manufacture of such plastic containers.

An apparatus according to the invention for moulding plastic containers includes a transport unit which transports the plastic containers. Further, a heating device is provided which heats at least an area of the plastic preforms. In addition, the apparatus includes a stretching device mechanically acting on the plastic preform, which stretching device stretches the plastic preform along its longitudinal direction. According to the invention, the heating device and the stretching device are arranged in such a way that the plastic preforms may be heated before and after the stretching operation of the plastic preforms (10).

Thus it is possible to heat the plastic preforms before and after the stretching of the same. Heating before the stretching process may, for example, be used for specifically stretching certain areas of the plastic preform during the expansion or the stretching, such for example an area below the support ring. Heating after stretching is used to expand the plastic preform afterwards, for example by blow moulding into the plastic container. It would also be possible to carry out the heating process both before and after the expansion as well as during the stretching of the plastic preform.

It would also be possible to carry out a stepwise heating process of the plastic preform, for example in a first heating step before the stretching and a second heating step after the stretching.

Advantageously, the heating device is mounted outside of the plastic preform and is also preferably stationary relative to the plastic preform. Thus, heating of the plastic preform is carried out in particular from the outside inwards.

It would also be possible to carry out an at least partially simultaneous stretching and heating of the plastic preform.

Whilst in the above described DE 33 141 06 the blowing up of the container is carried out at the same time as the heating of the container, which blowing up process is carried out without any tooling, the present invention suggests carrying out, during this process, rather a mechanical stretching of the plastic preform in the longitudinal direction thereof, for example by means of a stretching rod.

In blow moulding machines known so far, the plastic preforms are passed through an oven and in the course of this are completely heated up over their entire length. Only by controlling the heating performance in the heating zones may different temperature be applied to the plastic preforms, as a result of which the plastic preforms will be blown up into bottles having the respective wall thickness of the individual zones.

Thus, according to the invention it is suggested to combine the functions of stretching and heating, so that in the heating device, the wall thicknesses finally achieved will be determined as early as in the pre-blown bottle thus obtained, and in this way the bottle quality will be enhanced.

In a preferred embodiment, the heating device is a microwave heating device or the heating device includes a microwave heating device. Preferably, the plastic preform is passed through a resonator of this microwave heating device. In this case, this plastic preform may be synchronously heated, stretched and, if necessary, also pre-blown.

Preferably the heating device is designed in such a way that only selected areas of the plastic preform, for example an area below the support ring of the plastic preform, will be heated and other areas will be specifically excluded from the heating process. Thus, for example also the bottom area of the plastic preform may be excluded from the heating process.

The Applicant has realised that it may be advantageous in many cases not to heat the bottom of the plastic preform. Thus, it is possible to use less material in the first place to injection mould the bottom of the plastic preform, which is generally harder to stretch, since the stretching rod cannot penetrate through the cold bottom. In this way, also the need for subsequent cooling of the bottom could be eliminated. It would further be possible to produce a very thin bottom in a conventional injection moulding process; a very thin bottom without an injection point may be produced using a compression moulding process.

In a further advantageous embodiment, the apparatus includes a plurality of reception elements for receiving the plastic preforms, wherein the plastic preforms may be heated within these reception elements. Whilst in the heating device according to the prior art, the plastic preforms usually pass through a heating chamber together and are also heated together in this heating chamber, it is suggested here to provide reception elements or heating cavities for the individual plastic preforms, in which they are heated individually.

These reception elements are preferably reception elements which completely surround at least an area of the plastic preforms in the longitudinal direction thereof, for example the area below the support ring and, if necessary, above the bottom. Thus, individually allocated individual cavities may be provided for each plastic preform. These cavities may be heating pockets with IR heating elements, but could also be such heating elements which heat the plastic preforms by means of microwaves. It would also be conceivable to use a combination of IR and microwave heating devices.

In a further advantageous embodiment, the transport device includes a rotatable carrier for transporting the plastic preforms. Thus, the apparatus could be a so-called rotary oven wherein the plastic preforms (in cycles or in particular continuously) are transported on a circular path.

Further, the apparatus according to the invention preferably includes a blowing device in order to apply a gaseous medium and in particular pressurised air onto the plastic preform. In this way, the apparatus according to the invention allows synchronous stretching, heating and pre-blowing of the plastic preform. Preferably, the pre-blowing also serves the purpose of keeping the plastic preform spaced apart for example from a corresponding stretching rod during the stretching operation.

In a further advantageous embodiment, the apparatus includes a wall thickness measuring device which determines a wall thickness of the plastic preform. This wall thickness measuring device may be positioned above or below the resonator and may determine in this way the wall thicknesses thus measured. Advantageously, the apparatus also includes a control device for controlling the moulding process, which advantageously controls the apparatus as a function of the values measured by the wall thickness measuring device, for example as a function of measured wall thickness values, and which influences, for example, the microwave device or influences the transport of the containers through the microwave device and the like.

Thus, the apparatus advantageously also includes a transport device which transports the containers through the heating device. Advantageously, the transport device transports the containers through the heating device in the longitudinal direction thereof.

In a further advantageous embodiment, the stretching device includes a stretching rod which may be inserted into the plastic preform. This stretching rod is per se known from the prior art, however, it is used in the prior art exclusively in connection with blowing machines which expand already heated plastic preforms. However, it would also be possible to use other stretching devices, for example in connection with gripping elements which engage in a bottom area of the plastic preform and stretch this relative to the screw thread.

In one preferred embodiment, the stretching rod is made of a plastics material. This is particularly preferable in cases where the heating device is a microwave device, since this would be influenced by a metallic stretching rod. However, it would also be possible to produce the stretching rod specifically from a metal in order to influence the field distribution of the microwave heating device.

Preferably, the apparatus further includes a temperature measuring device which determines the temperatures of the plastic preform, and here it would be possible to determine in particular local temperatures of the plastic preform. It would also be possible to additionally determine and advantageously also readjust the temperature whilst withdrawing the plastic preform back out of the resonator. Besides, also the wall thickness and the cross section of the pre-blow bottle may be measured here.

If, as was mentioned above, the plastic preform is heated only in certain areas, so that an area of the same is cold, whilst a certain layer in the longitudinal direction thereof is heated, the pulling off of the neck may be facilitated in this way, in particular in cases where the plastic preform is initially heated below the support ring, is subsequently stretched and is only then heated again. In this case, a heating process is carried out before and after the actual stretching process. At the same time, however, the heating device and the stretching device are geometrically arranged in such a way that at the same time also the stretching and the heating processes may be carried out. Thus, the arrangement is in particular designed in such a way that within an overall period of time in which a heating process is carried out, also a stretching process is carried out.

In a preferred embodiment, a separate heating device is allocated to each plastic preform. In this way, a constant quality of the containers may be ensured independently from any geometrical or material-related fluctuations occurring during the manufacture of the plastic preforms. This may apply on the one hand to the microwave resonator already mentioned above as well as to a heating pocket having infrared radiators mounted therein. The infrared radiators in the heating pocket are here preferably disposed in a circumferential direction around the plastic preform.

In a preferred embodiment, the heating device includes an essentially closed radiation tunnel, through which the transport device transports the preforms. In the radiation tunnel, a plurality of infrared radiators and associated reflectors are arranged, which heat the plastic preforms. The infrared radiators are connected to the temperature measuring device and/or the wall thickness measuring device via the control device. Thus, on the basis of the data measured, the heating output of each individual radiator may be adjusted to a desired value.

Advantageously, the apparatus has a rotary device which rotates the plastic preforms about their longitudinal axis. This embodiment is particularly favourable in order to achieve a uniform heating of the plastic preforms in the circumferential direction.

In a further preferred embodiment, the stretching device and the heating device are arranged in a common module. It would be possible here, for example, for the stretching device to be mounted within a heating device such as, for example, a heating tunnel. Advantageously, a plurality of stretching devices is arranged within the heating device.

The present invention is further directed to a system for moulding plastic preforms into plastic containers, which includes an apparatus of the above-described kind as well as a moulding unit mounted downstream of this apparatus, which moulding unit moulds the containers produced in the apparatus into plastic containers. It is to be noted here that, as was mentioned above, the apparatus moulds the plastic preforms into intermediate containers, and the moulding unit mounted downstream thereof in turn brings the intermediate containers into their final form.

Advantageously, the moulding unit is formed without a stretching rod.

The present invention is further directed to a method for moulding plastic containers, wherein plastic preforms are transported and heated by means of a heating device and wherein the plastic preforms are stretched in the longitudinal direction by means of a stretching device, with the stretching device mechanically acting on the plastic preforms with a view to expanding the same. According to the invention, a heating process of the plastic preforms is carried out before and after the stretching of the plastic preforms (10).

It is possible here for the preform to be heated in a first heating stage, to be subsequently stretched and heated again in a further heating stage, which is advantageously followed by a blow moulding step. However, it would also be possible for the heating to be carried out during the stretching process. Preferably, at least some of the areas heated before the stretching of the plastic preform will be different to the ones heated after the stretching. This means that the areas to be heated before and after the stretching process will at least partially differ. It would also be possible for the heat outputs applied to the respective areas to be different before and after the stretching process.

It would also be possible for a first heating device to uniformly heat the plastic preform, in particular below the screw thread thereof, and a second heating device to specifically heat certain areas of the plastic preform, such as, for example, an area immediately below the support ring.

Advantageously, the stretching and heating of the plastic preforms will be carried out at least at times simultaneously. This is supposed to be understood to mean that for example a heating process is carried out within a predetermined time interval and may also be interrupted within this time interval and a stretching process may also be carried out at least at times within this interval, however, in particular simultaneously with the heating process. Thus, also a stepwise heating process with interposed stretching operations of the plastic preform is made possible.

Preferably, the plastic preforms are rotated about their longitudinal axis or about an axis which is parallel relative to this longitudinal axis.

In a further advantageous method, a pre-blow mould is provided within the resonator, by means of which the plastic preforms are expanded into a preform also within the context of the pre-blow process.

In a further advantageous method, a pre-blow mould is provided within the heating pocket, by means of which the plastic preforms are also expanded into a pre-blow mould within the context of the pre-blow process.

In particular, the pre-blow mould is provided for shaping the bottom of the container. This pre-blow mould is preferably made of plastic. The pre-blow mould may be removed using its own drive, in order to remove the pre-blow bottle from the heating device, and may be re-fed at a later time.

Advantageously here, too, the stretching rod is made from a plastic material or generally from a non-metallic material. Particularly preferably, also the pre-blow mould is made from a plastic material. However, for example a ceramic may also be used as a material.

In a further advantageous method, the stretching rods remain inside the plastic preforms during the rotation. In this way it is possible to mount heating boxes or heating devices closer to the preforms, as a result of which a higher efficiency of the method will be achieved.

In a further advantageous method, a control device controls the moulding process as a function of a wall thickness of the plastic preforms. This means that the wall thickness of the plastic preforms is advantageously measured separately in sections, and as a function of these measurement results the moulding process, for example the thermal effect or the transport speed, are modified. Advantageously, a transport device transports the containers at least at times in their longitudinal direction. Thus, any values output by a measuring device may be forwarded to a feeding device which controls the movement of the preform (through the resonator) accordingly.

In a further advantageous method, the control device controls the moulding process—in particular at least before the final shaping of the plastic preforms—as a function of the measured wall thickness and/or the measured temperature distribution of the plastic preforms. The final shaping of the plastic preform is supposed to be understood to mean in particular the final shape which the plastic preforms will have after the completed moulding process, such as the shape of the finish-blown bottle.

Also a control of the plastic preforms or pre-blown bottles, which is carried out as a function of images captured and evaluated by a camera, is of advantage. Advantageously therefore, for example also a stretching speed or a pre-blow pressure may be modified.

BRIEF DESCRIPTION OF THE DRAWINGS

Further advantages and embodiments will become evident from the attached drawings, wherein.

DETAILED DESCRIPTION OF THE INVENTION

Figure 1:
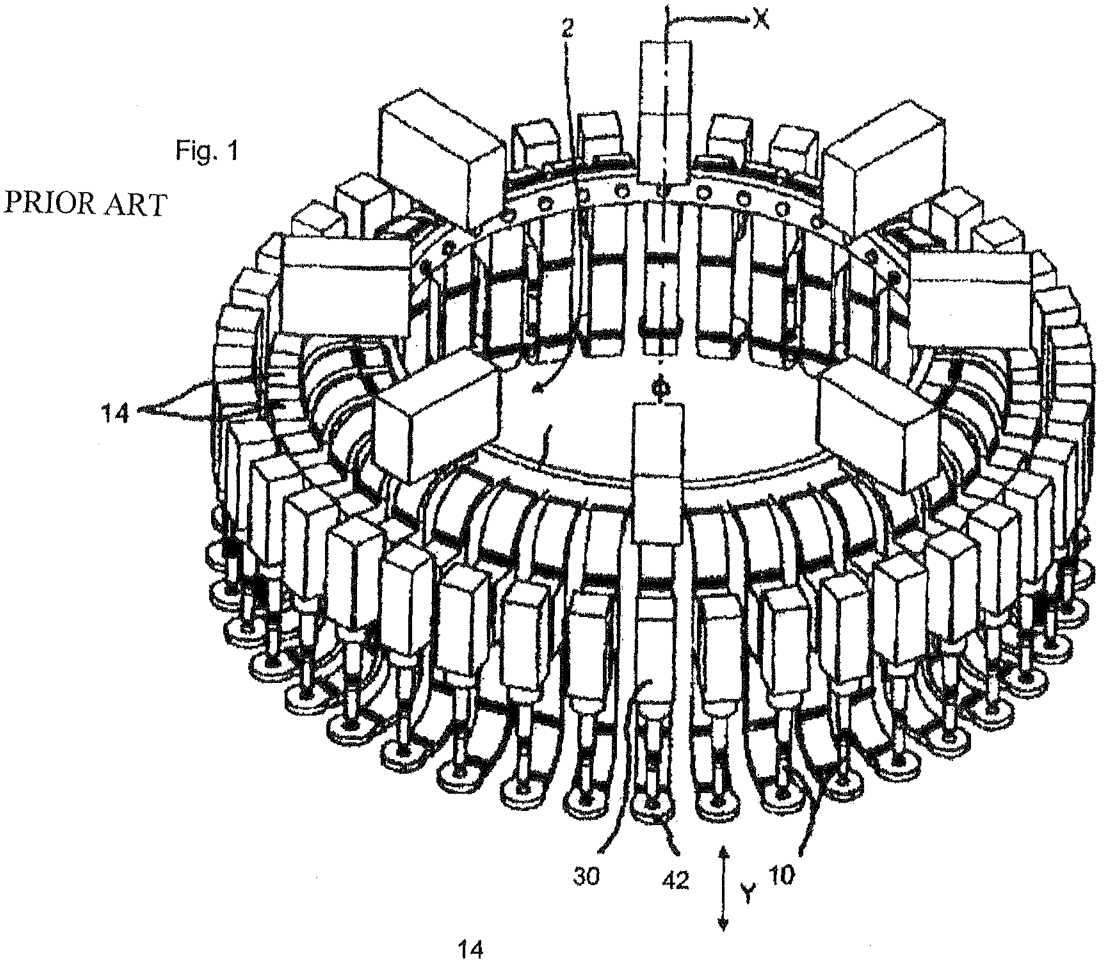
FIG. 1 shows a view of a heating device according to the prior art.

FIG. 1 shows an apparatus according to the prior art. Here, a transport device 2 is provided which moves the individual plastic preforms 10 here in the circumferential direction (about a rotational axis X). Further, a plurality of heating devices 4 (see FIGS. 3*a* and 3*b*) is provided, each of which includes resonators 42 in order to heat the plastic preforms. Power control elements 14 are respectively provided on the individual heating devices. The containers are displaced in the direction Y relative to the resonators in order to be heated.

Figure 2:
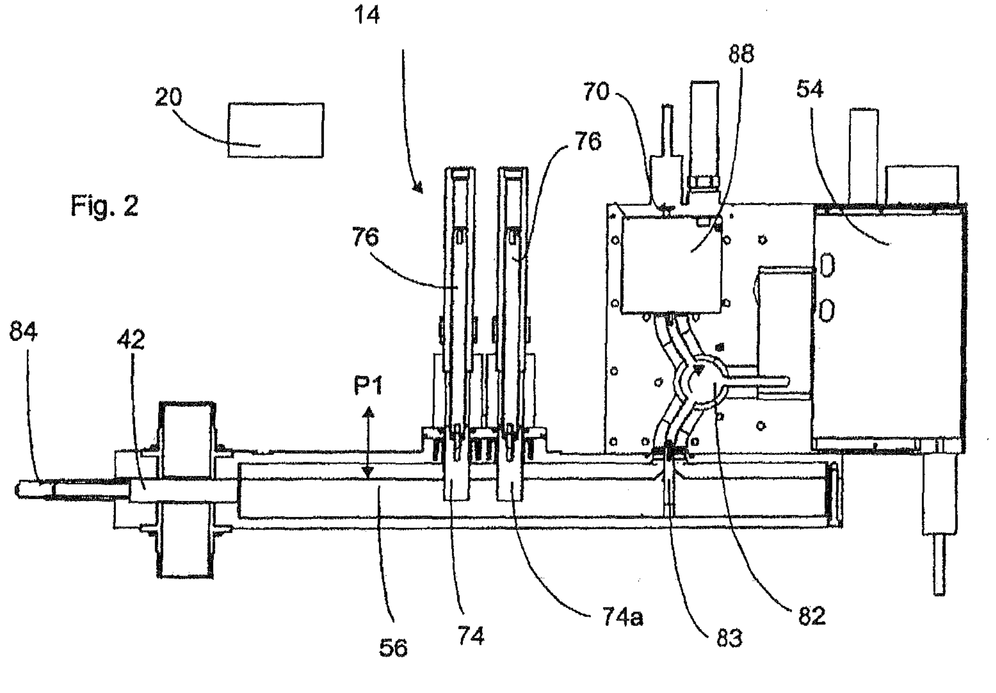
FIG. 2 shows a schematic view of a microwave heating device.

FIG. 2 shows a schematic view of a microwave heating device according to the invention. This apparatus includes a magnetron 54 which has already integrated therein a heating device (not shown). In this magnetron 54, the microwaves are generated and are passed into a circulator 82. Starting from this circulator, the microwaves are introduced into a conducting unit 56 in the form of a microwave waveguide or a rectangular waveguide by means of an input device 83. From there, the microwaves get into a resonator 42 or into the containers 10 (not shown) arranged within this resonator. The containers are here inserted into the resonator 42 in the direction of the arrow P1.

Reference numeral 84 relates to a pyrometer which is mounted on the resonator and which measures the temperature of the preforms in a contactless manner. The microwaves returning from the containers get into the circulator and from there into a water load 88. This water load 88 is used for attenuating the microwaves. By means of a sensor device 70 in the form of a diode, the returning microwave energy may be measured. The measured values in turn are received by a control device 20 and are used for performance tuning. However, it would also be possible to use, in addition to or instead of the values measured by the sensor device, the values output by the pyrometer 84 for tuning the performance or the energy. Apart from that, the pyrometer could also be used to modify the heating phase.

Reference numerals 74 and 74*a* relate to a regulating body or to regulating pins for regulating the power of the microwave heating device, and reference numeral 76 relates to a drive unit for moving the pins 74 and 74*a*.

Figure 3A:
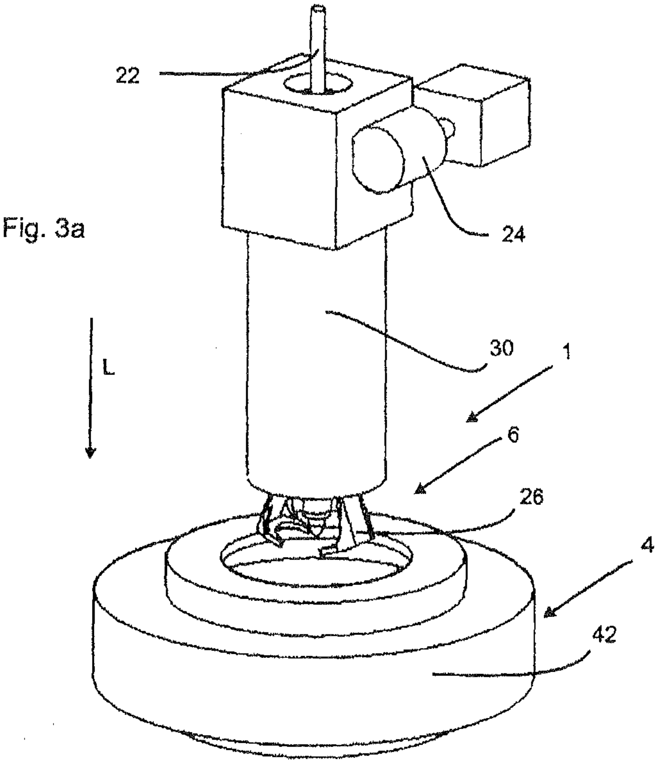
FIG. 3*a* shows a perspective view of an apparatus according to the invention in a first condition.

FIG. 3*a* shows a perspective view of an apparatus 1 according to the invention. This apparatus has here a heating device 4, of which, however, only one microwave resonator 42 is shown. The preforms to be moulded are transported through this resonator 42 in their longitudinal direction L and are heated therein. Reference numeral 6 relates to a stretching device having here two gripping elements 26 which hold the plastic preform below its support ring. To this end, the two gripping elements 26 shown pivot inwards and thus encircle the preform below its support ring. Subsequently, the preform may be stretched by means of the stretching rod 22 moving in the longitudinal direction L. Reference numeral 24 identifies a drive unit for moving a housing 30 also in the longitudinal direction L. The drive unit 24 will preferably be a servo drive with a gear assembly.

Figure 3B:
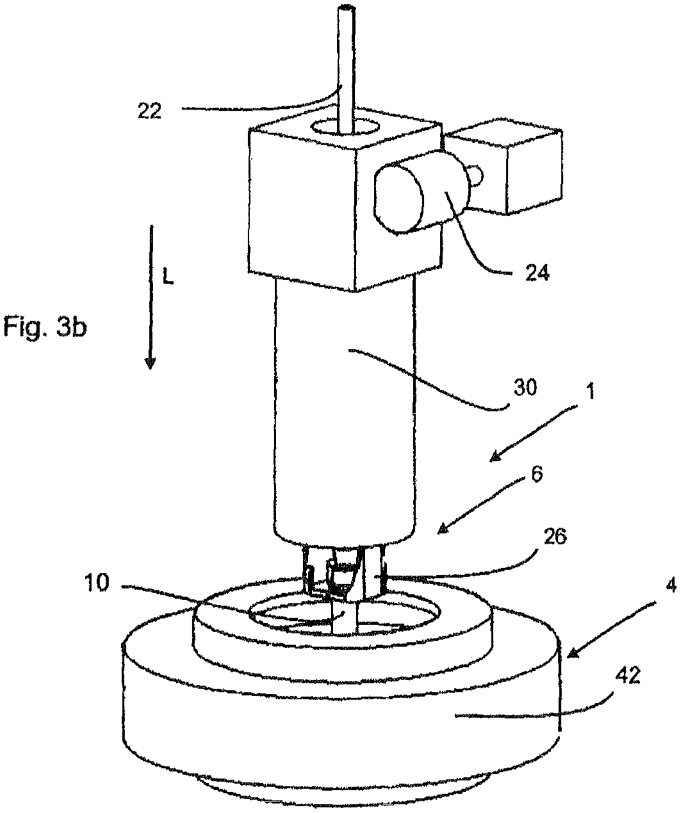
FIG. 3*b* shows a perspective view of an apparatus according to the invention in a second condition.

FIG. 3*b* shows an apparatus from FIG. 3*a*, but the gripping elements 26 may here be pivoted inwards and grasp a container 10.

Figure 4:
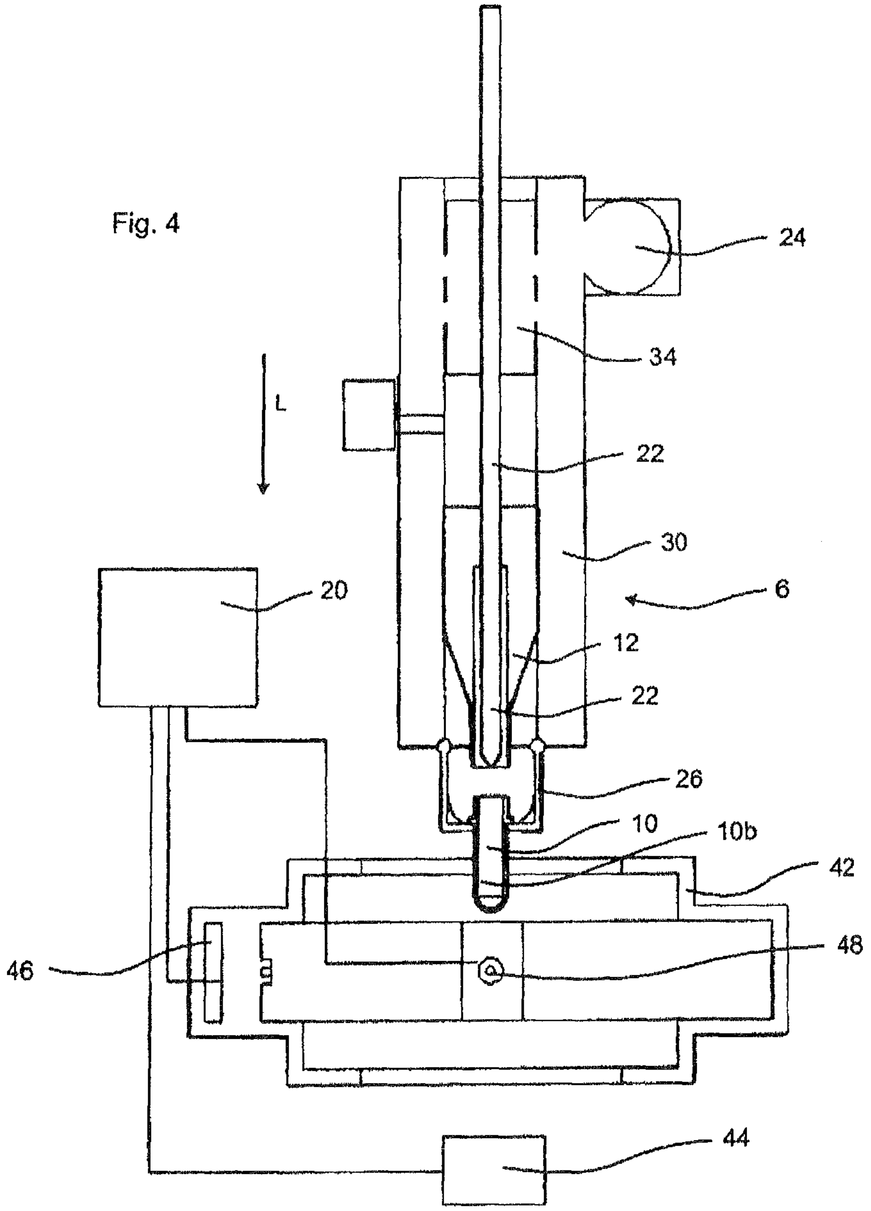
FIG. 4 shows a sectional view of an apparatus according to the invention.

FIG. 4 shows a sectional view of the apparatus 1 according to the invention. This further shows a motor, in particular a linear motor 34, which is provided for moving the stretching rod 22 in particular relative to the housing 30. These components are part of the stretching device which is generally identified with 6.

The gripping elements 26 are pivotably mounted on this housing 30 and are therefore moved together with the latter. As shown in FIG. 4, the entire preform 10 may in this way be displaced relative to the resonator 42 of the heating device 4. Reference numeral 12 relates to a blow device in order to apply pressurised air onto the preform 10. Thus, unlike the prior art, the apparatus according to the invention includes another gripping system for the containers, and apart from that also an additional valve block and, as mentioned, the stretching rod 22 are provided. It would also possible to apply the method and the apparatus according to the invention to conventional ovens, i.e. linear infrared ovens, but this would require modifications to the system.

Reference numeral 48 relates to a sensor for carrying out layer thickness measurements. In detail, the wall thickness of a base body 10*b* of the preform may be measured by means of this sensor 48 in particular in a contactless manner. Reference numeral 46 relates to a temperature measuring device which determines the temperature of the preform 10 also in a contactless manner. Here, the temperature may in particular be measured in a spatially resolved manner. Reference numeral 44 relates to a sensor for examining the bottom of the preform.

A control device 20 receives the data determined by the sensors 44, 46, 48, respectively, and may on the basis of this data control on the one hand a resonator performance of the heating device 4, but on the other hand also the drive units 24 and 34, in order to modify the moulding process in this way. Thus, a control circuit is suggested here, which also includes measurement results of the wall thickness measurement, of the bottom measurement and of the temperature measurement of the preform 10 in the control of the moulding process.

FIGS. 5*a*-5*e* describe the method steps of a method according to the invention. In the method step shown in FIG. 5*a*, the plastic preform is still located outside of the resonator 42, however, it is already held by the gripping devices 26 below the support ring 10*d* thereof. In addition, the stretching rod 22 has not yet entered into the plastic preform in this condition.

Figure 5A:
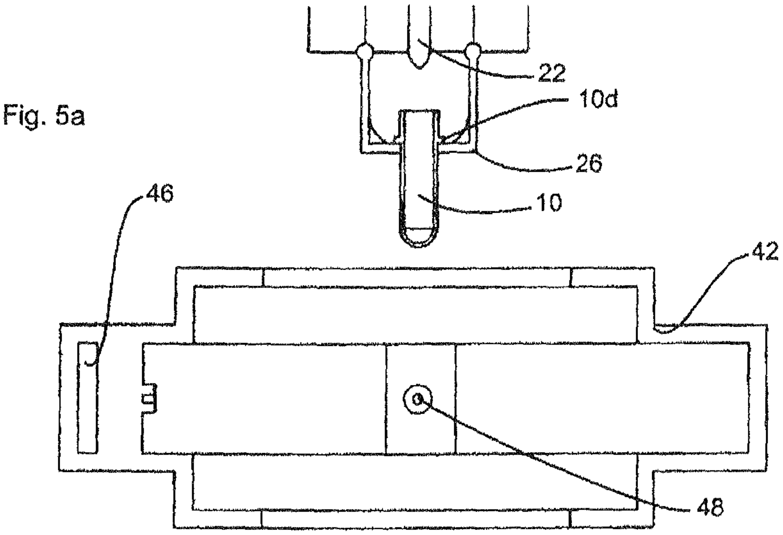
FIGS. 5*a*-5*e* show views for illustrating a moulding process.
Figure 5B:
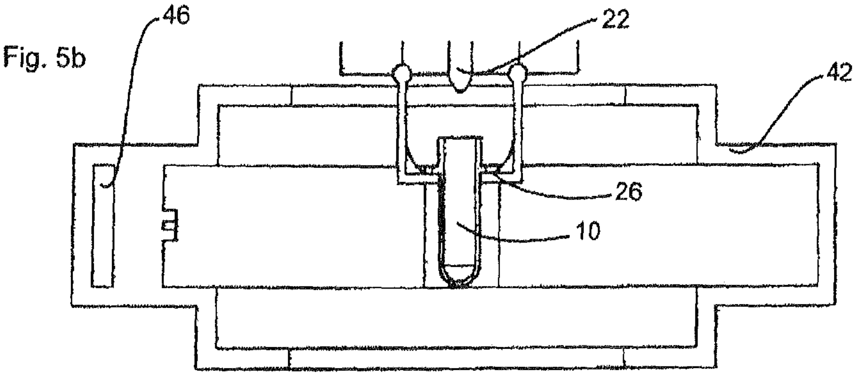

In the situation shown in FIG. 5*b*, the plastic preform 10 has already completely moved into the resonator 42, but the stretching rod 22 has not yet entered into the container. In order to save time during the introduction of the container into the resonator it would, however, also be possible to already insert the stretching rod 22 into the container partially or to such a degree that it is not yet in contact with an internal wall of the container or the (plastic) preform.

The stretching rod 22 is preferably provided with a coating, in particular a Teflon coating, which prevents the preform 10 from sticking to the stretching rod 22. Thus, removal of the stretching rod 22 from the inside of the preform 10 may be ensured without any additional deformation of the preform 10.

Figure 5C:
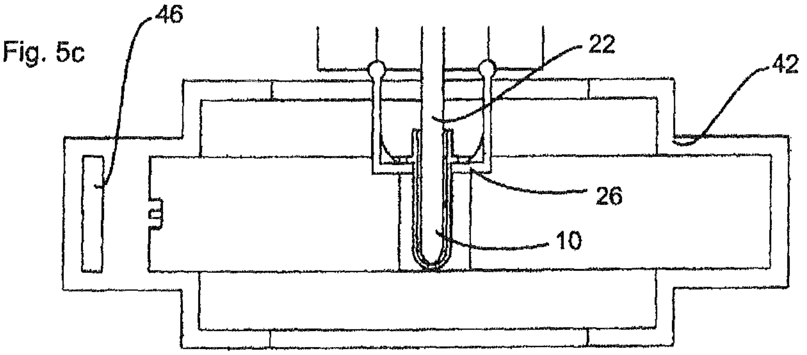

In the situation shown in FIG. 5*c*, the stretching rod 22 has completely penetrated into the container 10 and at this moment the stretching process may commence. In the resonator 42, microwaves are applied to the container 10 which is thus heated.

Figure 5D:
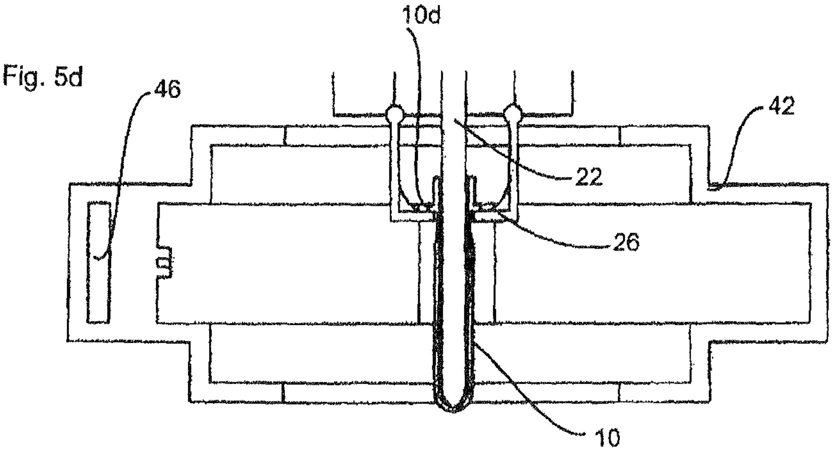

In the situation shown in FIG. 5*d*, the plastic preform has been stretched and the resonator is implemented here in such a way that in particular the area below the support ring 10*d* is heated, so that this area is especially heated and thus expands. What can therefore be seen here is the stretched area 10*a* below the support ring 10*d*. The remaining areas of the preform 10 are not heated or are heated to a lesser degree, so that they will only expand to a lesser degree as a result of the action of the stretching rod 22.

Figure 5E:
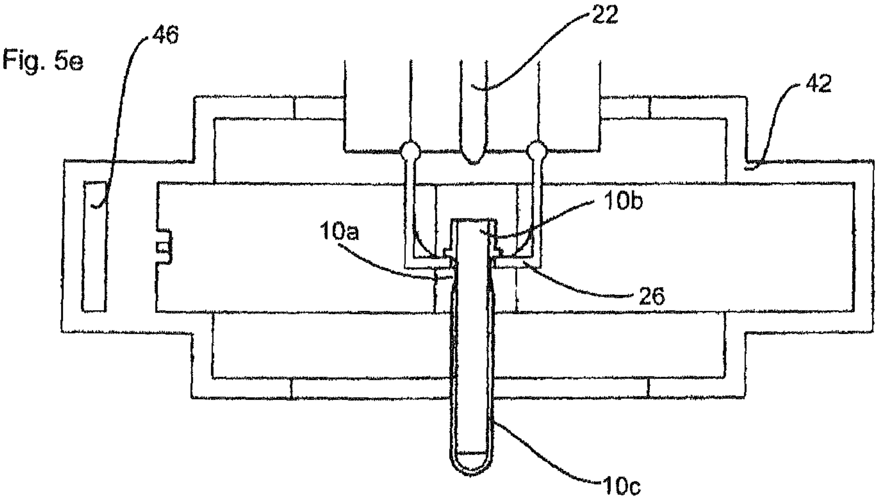

In the situation shown in FIG. 5*e*, the stretching process is completed and the stretching rod 22 has been withdrawn. Subsequently, the plastic preform 10 may be removed from the resonator and may be transferred to a further blowing station in which the thus partially stretched preform is expanded into a plastic container.

Figure 6:
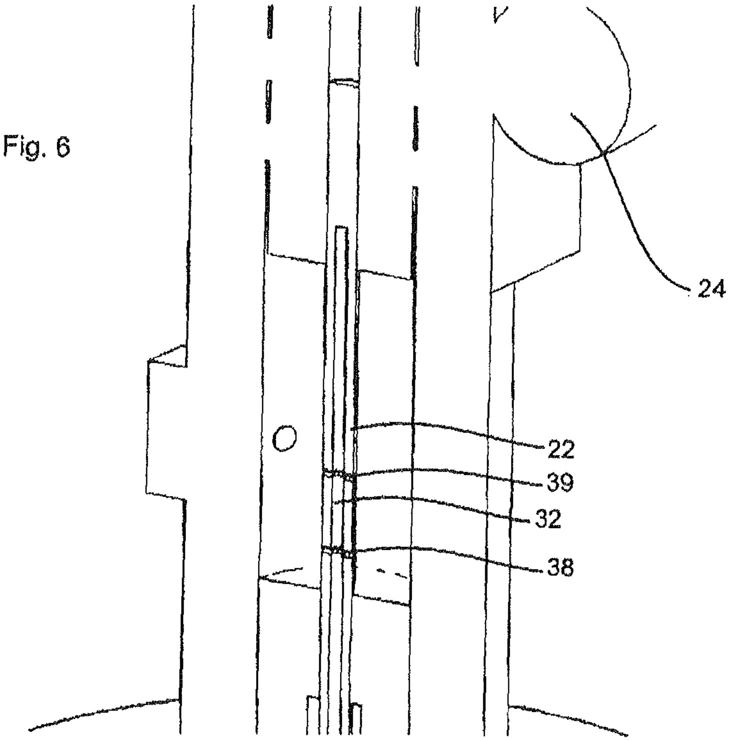
FIG. 6 shows a detailed view of a further embodiment according to the invention.

FIG. 6 shows a further embodiment of an apparatus according to the invention. In this embodiment, the stretching rod 22 has a channel 32 on the inside with several subchannels 38 and 39. In this way, a gaseous medium may be applied to the stretching rod, so that upon inserting the stretching rod 22 into the plastic preform 10, also pressurised air may be supplied to the latter. By supplying this pressurised air it may be prevented that the preform 10 sticks to the stretching rod 22 during the longitudinal extension thereof. With this variant it would also be possible for a pre-blow mould to be already present in the resonator, against which the plastic preform may be expanded. In a subsequent main blowing process, the plastic preform could be brought to its ultimate shape.

It would thus be possible for a pre-blow bottle thus produced to be transferred to a blowing module and to be finish-blown there. Advantageously, a stretching process is no longer required in such a blowing process.

The gripping elements 26 shown in FIG. 3 also correspond to the ones shown in this embodiment. In order to control these gripping elements 26, cam controls may be used, however, it would also be possible to provide spring elements for the opening and closing clamp. Further, a magnetic drive for these gripping elements 26 or electromotoric drives would be conceivable.

FIGS. 7*a*-7*e* show several method steps when operating with the application of air. In the situation shown in FIG. 7*a*, the plastic preform 10 has already been introduced into the resonator 42, but the stretching rod is still located outside thereof. It can be seen that here, too, the stretching rod has a bottom opening 49, through which air may be applied onto the plastic preform 10.

Figure 7A:
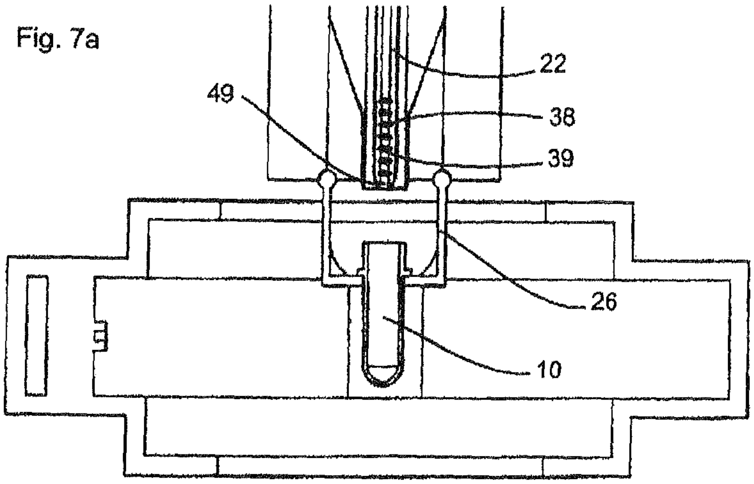
FIG. 7*a*-7*e* show views for illustrating a further method according to the invention.
Figure 7B:
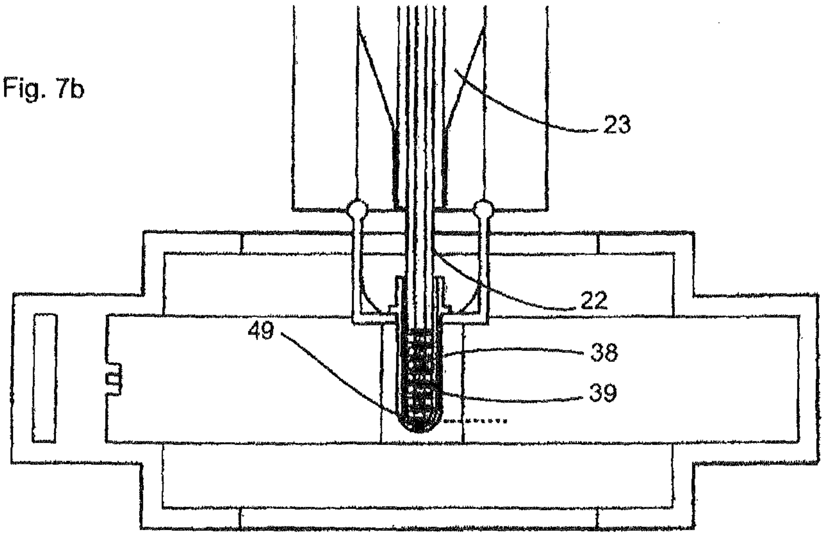
Figure 7C:
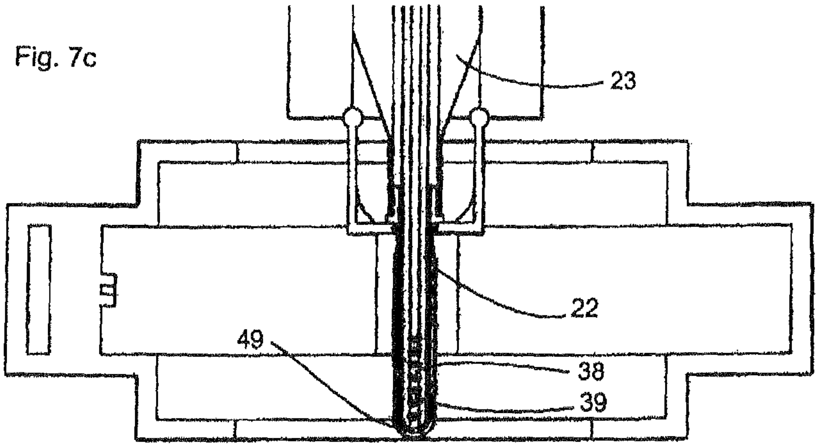

In the situation shown in FIG. 7*b*, the stretching rod 22 has been completely moved into the container 10 and the expansion process may commence. In the situation shown in FIG. 7*c*, the stretching rod stretches the preform 10 and at the same time applies air onto the internal space thereof, so that the plastic preform 10 is prevented from sticking to the stretching rod 22. At the same time it can be seen that the blow nozzle 23 sits on top of the support ring 10*d* of the preform 10, in order to seal the latter. Expansion may be carried out both via the blow nozzle 23 and via the stretching rod 22.

Figure 7D:
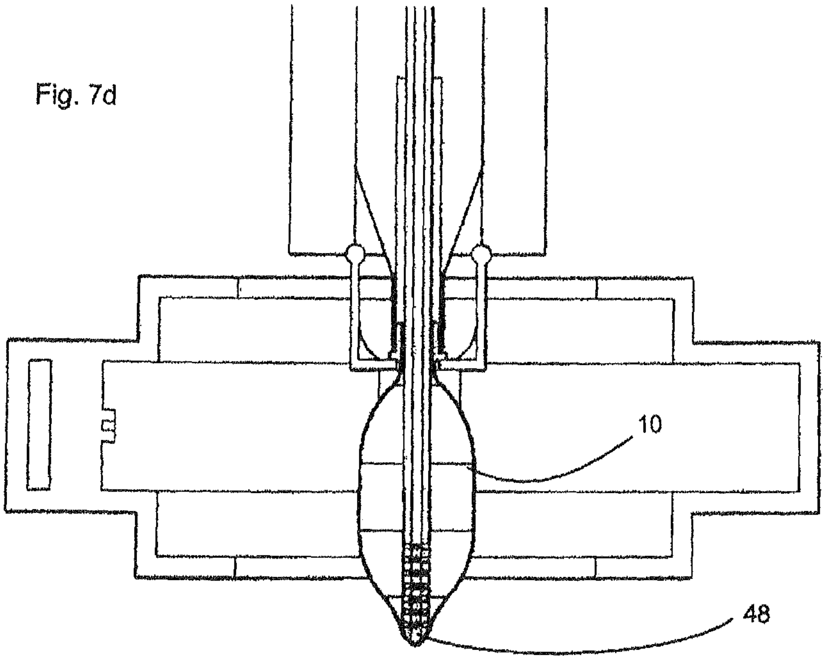

In the situation shown in FIG. 7*d*, air continues to be supplied via the stretching rod, so that the plastic preform will also be expanded in its radial direction. In this case it would be possible, as was mentioned above, to provide a preform within the resonator.

Figure 7E:
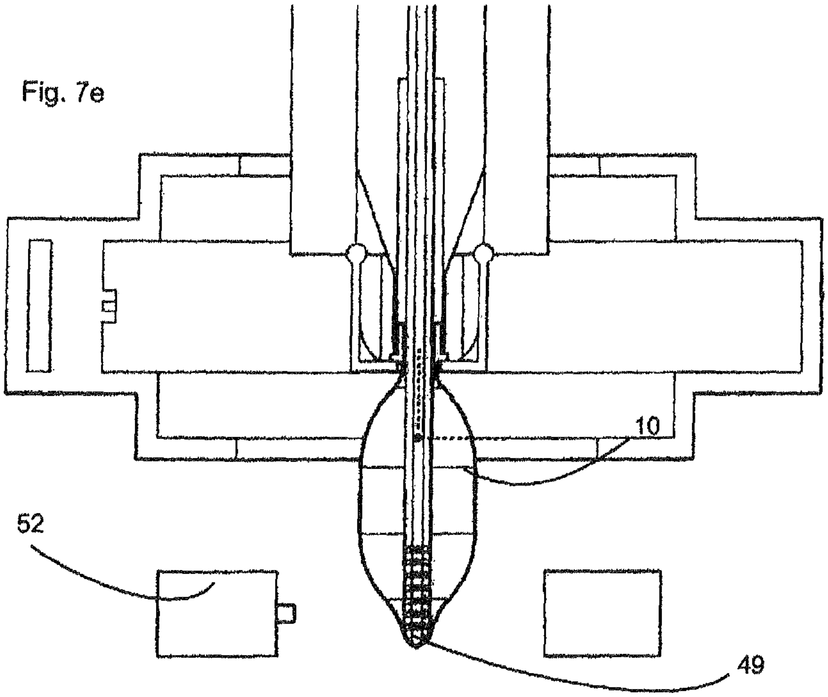

In the situation shown in FIG. 7*e*, the housing 30 moves with the gripping devices and the container even further into the resonator, so that a larger part of the container 10 projects downwardly out of the resonator. Reference numeral 52 in FIG. 7*e* relates to an image capturing device which inspects the pre-blow process. It is further possible for the complete housing 30 to rotate, in order to achieve in this way also a rotation of the plastic containers 10. Instead of the image capturing device 52, it would also be conceivable to use a wall thickness measuring device and/or a temperature measuring device. The data from the measurements carried out on the pre-blow bottle 10 may also be forwarded to the control device 22 for readjustment purposes. During readjustment, the temperatures of individual areas, but also the stretching of individual areas may be adjusted by a repeated heating or stretching of the pre-blow bottle 10. To this end, the transport device 2 transports the pre-blow bottle again through the heating device 4 and the steps from FIGS. 5*a* to 5*e* or 7*a* to 7*e* may be repeated. In reverse, it would also be possible to carry out a pressure-controlled cooling of the pre-blow bottle 10 via the bores of the stretching rod 38, 39, 49 and of the outlet via the blow nozzle 23, if certain areas of the pre-blow bottle 10 are excessively heated.

The stretching device 6, components thereof and/or the stretching rod 22 itself/themselves could be temperature controlled or cooled, in order to prevent the material of the plastic preform from sticking to thereto during the stretching process. It would further be possible for the stretching device 6 or the stretching rod 22 to have venting holes. Further, it would be possible to apply a further low pressure level (support pressure) prior to an expansion at the pre-blow pressure, which is used to prevent the plastic preform from sticking. Such a support pressure could, for example, be in a range of from 0.1 bar to 5 bar.

Finally, it would also be possible to stretch the plastic preform by means of a gripping device which engages in the plastic preform (in particular from the outside) by its bottom end or by its bottom area and stretches in the longitudinal direction of the plastic preform. Here, a gripping device may be provided which mechanically engages in the plastic preform, however, it would also be conceivable to achieve a "gripping" or stretching action by means of a vacuum applied to the bottom area of the plastic preform. In this way, this gripping device or the vacuum supply device would constitute the stretching device according to the invention.

The Applicant reserves the right to claim individual or all of the features disclosed in the application materials as being essential to the invention, in as far as they are novel over the prior art either individually or in combination.

LIST OF REFERENCE NUMERALS

1 Apparatus
2 Transport device
4 Heating device
6 Stretching device
10 (Plastic) preform, container, pre-blow bottle
10*a* Stretched area
10*b* Base body
10*d* Support ring
12 Blow device
14 Performance control elements
20 Control device
22 Stretching rod
23 Blow nozzle
24 Drive unit
26 Gripping elements
30 Housing
32 Channel
34 Linear motor
38, 39 Sub-channels
42 Resonator
44 Sensor for examining the bottom
46 Temperature measuring device
48 Wall thickness measuring device
49 Bottom opening
52 Image capturing device
54 Magnetron
56 Conducting device
70 Sensor device
74, 74*a* Regulating body
76 Drive devices for regulating bod
82 Circulator
83 Input device
84 Pyrometer
88 Water load
L Longitudinal direction
X Rotational axis
Y Direction

The invention claimed is:

1. An apparatus for moulding plastic bottles from plastic preforms, including a transport device which transports the plastic preforms, including a heating device for heating areas of the plastic preforms, and including a stretching device mechanically acting upon the plastic preforms, which stretching device stretches the plastic preforms along the longitudinal direction (L) thereof, wherein the heating device and the stretching device are arranged in such a way that the plastic preforms may be heated before and after the stretching of the plastic preforms, wherein at least some of the areas heated before the stretching of the plastic preforms are different from areas heated after stretching, wherein the stretching device comprises gripping elements, which grip the preform below its support ring.

2. The apparatus as claimed in claim 1, wherein the heating device is a microwave heating device.

3. The apparatus as claimed in claim 1, wherein the heating device is designed in such a way that it heats only predetermined partial areas of the plastic preform and in particular in such a way that a bottom area and/or a screw thread area of the plastic preform is/are not heated.

4. The apparatus as claimed in claim 1, wherein the apparatus includes a plurality of reception elements for receiving the plastic preforms, wherein the plastic preforms may be heated within these reception elements.

5. The apparatus as claimed in claim 1, wherein the transport device includes a rotatable carrier for transporting the plastic preforms.

6. The apparatus as claimed in claim 1, wherein the apparatus includes a blow device in order to apply a preferably gaseous medium onto the plastic preforms.

7. The apparatus as claimed in claim 1, wherein the apparatus includes a wall thickness measuring device for determining a wall thickness of the plastic preforms.

8. The apparatus as claimed in claim 1, wherein the apparatus includes a control device for controlling the moulding process.

9. The apparatus as claimed in claim 1, wherein the stretching device includes a stretching rod which may be inserted into the plastic preform.

10. The apparatus as claimed in claim 9, wherein the stretching rod is made from a plastic material.

11. The apparatus as claimed in claim 1, wherein the apparatus includes a rotating device which rotates the plastic preforms about the longitudinal axis thereof.

12. The apparatus as claimed in claim 1, wherein the stretching device and the heating device are mounted in a common module.

13. The apparatus as claimed in claim 1, wherein a bottom area of the preform is excluded from the heating process.

14. The apparatus as claimed in claim 1, wherein the heating of the preform is used for stretching an area immediately below a support ring of the preform.

15. The apparatus as claimed in claim 1, wherein a temperature measuring device is provided for measuring a temperature of the preforms in a contactless matter.

16. The apparatus as claimed in claim 15, wherein the temperature measuring device is mounted on a resonator of the heating device.

17. The apparatus as claimed in claim 16, wherein the gripping elements are pivotable.

18. A system for moulding plastic bottles from plastic preforms, including an apparatus with a transport device for transporting the plastic preforms, a heating device for heating areas of the plastic preforms, and a stretching device mechanically acting upon the plastic preforms before and after the stretching of the plastic preforms, wherein the device stretches the plastic preforms along the longitudinal direction (L) thereof, wherein the heating device and the stretching device are arranged to heat the plastic preforms, wherein the same heating device is used for the heating before and after the stretching of the plastic preforms, and wherein a moulding unit is arranged downstream of the apparatus, for moulding the containers produced in the apparatus into plastic containers.

19. The apparatus as claimed in claim 18, wherein the transport device transports the preforms during heating of the preforms.

20. The apparatus as claimed in claim 1, wherein only a bottom area and/or only an area below the support ring is shaped in a first shaping step.

21. An apparatus for moulding plastic bottles from plastic preforms, including a transport device which transports the plastic preforms and including a heating device for heating areas of the plastic preforms and including a stretching device mechanically acting upon the plastic preforms, which stretching device stretches the plastic preforms along the longitudinal direction (L) thereof, wherein the heating device and the stretching device are arranged in such a way that the plastic preforms may be heated before and after the stretching of the plastic preforms, wherein at least some of the areas heated before the stretching of the plastic preforms are different from areas heated after stretching, wherein the stretching device comprises a channel on the inside to supply pressurized air to the preform.

* * * * *